United States Patent Office 3,534,368
Patented Oct. 13, 1970

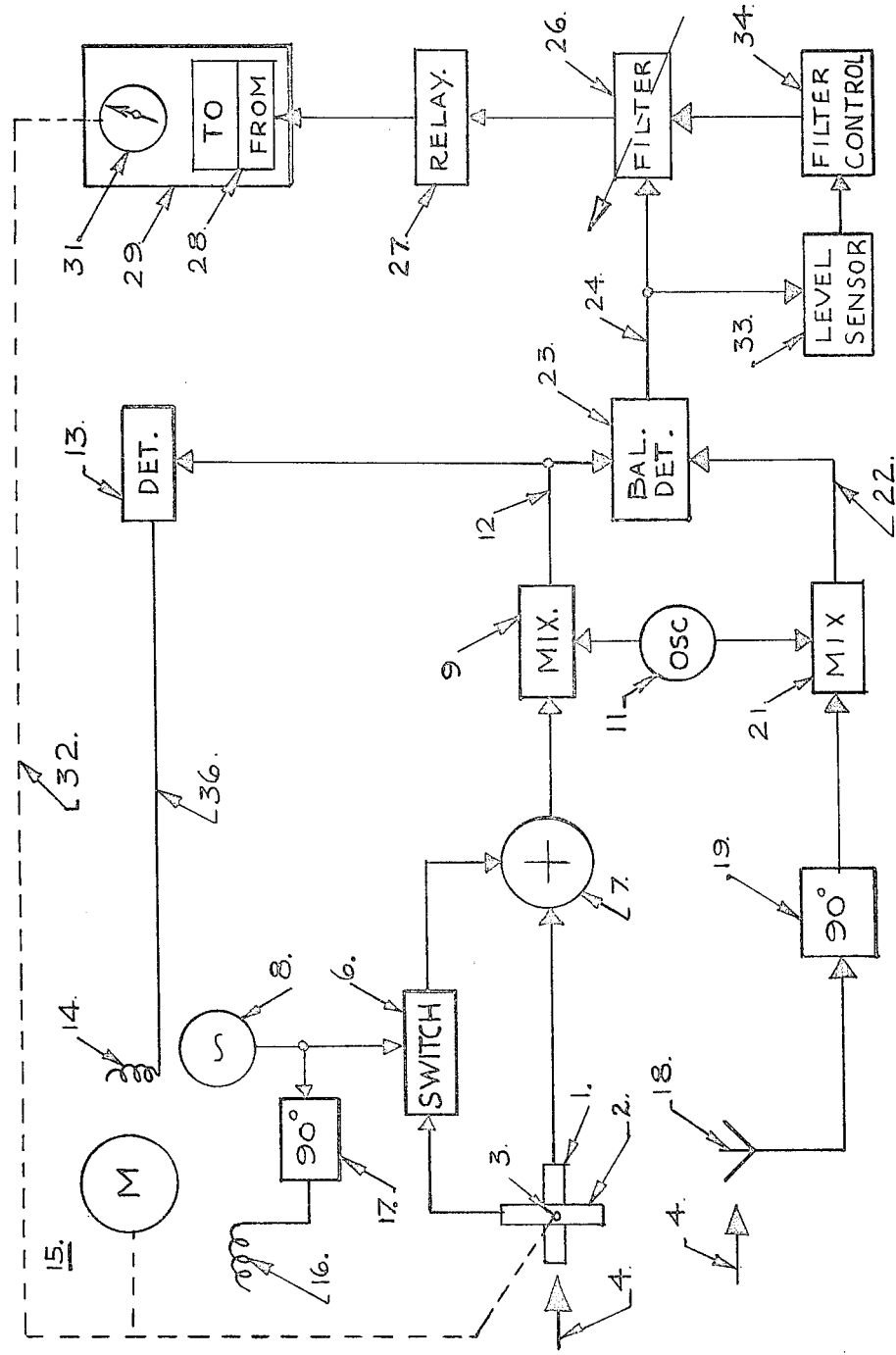

3,534,368
DUAL MODE AUTOMATIC DIRECTION FINDERS
Lloyd J. Perper, Tucson, Ariz., assignor to Electro Technical Analysis Corporation, Tucson, Ariz.
Filed Sept. 16, 1968, Ser. No. 759,985
Int. Cl. G01s 3/18, 3/42
U.S. Cl. 343—117                    5 Claims

ABSTRACT OF THE DISCLOSURE

Directional and sense input signals are separated into two isolated channels. The directional input signal alone operates an accurate indicator of the incoming signal direction but with 180° ambiguity. The sensing signal is mixed with the directional signal, is filtered using an adjustable time constant and operates an ambiguity-resolving indicator.

---

This invention relates to automatic radio direction finders.

Automatic radio direction finders typically employ a directional loop antenna and an omnidirectional or sense antenna. The loop output is periodically modulated or reversed, then mixed with the sense antenna output. The mixed signal is envelope detected and the output is employed to move the loop toward its null position; the position 90° thereto then indicates the direction from which the signals are being received, with 180° ambiguity resolved by the sense antenna.

In such a circuit the sense signal is much stronger than the loop signal but carries a far larger proportion of local radio noise. Upon mixing the sense and loop signals, the noises are added, so that noise from the sense signal tends to drown out the weak signal of interest from the loop antenna. The effect of the sense noise is to cause jitter of indicated angle, whereas the angle is actually ambiguous only between 0 and $\pi$.

The present invention eliminates this fault. The loop signals alone, containing only a small amount of noise, actuate the direction indicator; the sense signal is combined in a separate channel with loop signal information and filtered, with an adjustable time constant of integration. This time constant may be made so large as to eliminate nearly all noise interference. The output operates an indicator which resolves the ambiguity of the direction indicator.

One purpose of this invention is to provide an automatic direction finder which will provide a positive direction indication under high noise conditions.

Another purpose of this invention is to provide an automatic direction finder which is accurate under high noise conditions.

A better understanding of the invention can be secured by reference to the single drawing showing a preferred embodiment of the circuit of the invention.

Referring now to the figure, a first directional antenna 1 may be, for example, a loop antenna. A second directional antenna 2 may also, for example, be a loop antenna. These antennas are joined together in any desired manner and configuration so that they rotate in concert and maintain between them a 90° angle. For example, as indicated in the figure, the two loops may be crossed and on the same axis of rotation 3. The figure shows the direction of the incoming radio signal by the arrow 4.

The signal output of loop 2 is passed through a reversing switch 6 to an adder 7 and the output of loop 1 is passed directly to adder 7. Switch 6 is actuated by a generator 8 having, for example, a frequency of 110 hertz. In place of switch 6 a periodic modulator may be employed.

The output of adder 7 is applied to a mixer 9, where the output is converted by heterodyning with the output of an oscillator 11 to an intermediate frequency in conductor 12.

Conductor 12 is connected to the input of a detector 13, which may be of either the envelope or coherent type. The output of detector 13, having the frequency of generator 8, is applied to one phase winding 14 of a two-phase motor 15. The other phase winding 16 is connected for actuation through a 90° phase-shifting circuit 17 to the output of generator 8. The shaft of motor 15 is connected to rotate the common shaft 3 of the two loops 1 and 2, and thus to rotate the two loops.

An omnidirectional sense antenna 18 is connected through a 90° phase-shifting circuit 19 to a mixer 21 which is also connected to oscillator 11, thus converting the antenna 18 signal to the intermediate frequency in conductor 22.

Conductors 12 and 22 are connected to the two inputs of a balanced detector 23 having a single output circuit 24. The detector output circuit 24 is connected to the input of a filter 26. This filter 26 may be adjustable or fixed, preferably the former. The filter output is connected to a two-position device which may be, for example, a polarized relay 27. The relay contacts alternatively operate two lamp circuits. One lamp illuminates a sign TO and the other lamp illuminates a sign FROM. These signs 28 are incorporated in an indicator unit 29 which also includes a directional indicator 31 having a 360° azimuth scale and an indicator hand having one end identified, as by an arrow head. The indicator hand is connected, mechanically or electrically, for rotation by the shaft 32 of motor 15.

The output conductor 24 of detector 23 is also connected to a signal amplitude or level sensor circuit 33 having an output amplitude proportional to the signal input amplitude. This may be an electronic amplifier. The output is applied to a filter control 34 which may, for example, consist of a marginal relay operating and releasing at selected input signal amplitudes. The relay contacts operate to change the time constant of the filter 26 by, for example, inserting or removing a capacitor. Alternatively, the filter 26 and control 34 may be designed, as is well understood by those skilled in this art, for continuous proportional control of the time constant.

In the operation of this invention, the crossed loops 1 and 2, with low-frequency reversing switch 6 and adder 7, operate much as an automatic direction finder of the prior art to produce a signal of 110 hertz in conductor 36. This signal actuates motor winding 14 to rotate motor 15, rotating the loops. When the loop 2 plane is normal to the space signal, the 110 hertz energization of winding 14 falls to zero and the motor rotation stops.

It is obvious that other arrangements of this, the conventional part of the circuit may be employed in this invention. For example, a single loop 2 may be employed in place of the two loops 1 and 2.

The signal from omnidirectional antenna 18 is phase shifted 90° in circuit 19 as is conventional, is beat to intermediate frequency in mixer 21, and is combined in balanced detector 23 with the loop signal. The output of detector 23 consists of direct current which is positive in one position of loop 1 at null, and is negative in the loop position 180° thereto. This direct current may be highly contaminated with noise, but the signal of interest can always be filtered by making the time constant of filter 26 long enough. For example the filter time constant may be made from a few milliseconds to one second for strong signals, and may be made as long as one minute or more for weak signals.

The time constant of the filter 26 is automatically adjusted in inverse proportion to signal strength by means of the level sensor 33 and filter control 34. Control may be one-step, multi-step or continuously proportional.

When the output of detector 23 is of one polarity, the filtered output causes relay 27 to assume a position and one of the words of signs 28 to be illuminated, indicating that the arrow of indicator 31 is pointing to or from the signal source, as the case may be. When the output of detector 23 is of the opposite polarity, the other word of sign 28 is illuminated, indicating the reverse direction of indicator 31 is the correct direction.

In place of the sign 28, any other indicator means may be used to indicate the resolution of 180° ambiguity. For example, the indicating arm of indicator 31 may be constructed with lamps or arrows, one lamp or arrow on each end of the arm. When the relay is in one position the lamp is lit or the arrow is made visible on one end of the arm, and in the other relay position the other arm end is so indicated.

What is claimed is:
1. An automatic radio direction finder comprising:
   at least one directional antenna;
   a periodic modulator in the output of one directional antenna;
   a detector connected to the output of said at least one directional antenna;
   means for rotating said at least one directional antenna;
   an angle indicator connected to said means for rotating;
   means connecting the output of said detector to operate said means for rotating;
   an omnidirectional antenna;
   a 90° phase-shifting circuit connected to the output of said omnidirectional antenna;
   a balanced detector;
   means connecting the two inputs of said balanced detector respectively to the output of said 90° phase-shifting circuit and to the input of said detector;
   a filter connected to the output of said balanced detector;
   polarity-sensing means connected to the output of said filter; and
   polarity-indicating means connected to said polarity-sensing means for operation thereby.

2. A direction finder in accordance with claim 1 in which said means connecting the two inputs of said balanced detector respectively to the output of said 90° phase-shifting circuit and to the input of said detector includes mixing means and an oscillator whereby the two input signals applied to the balanced detector are heterodyned to an intermediate frequency.

3. A direction finder in accordance with claim 1 in which said filter is adjustable whereby its time constant is adjusted.

4. A direction finder in accordance with claim 3 in which a level sensor is connected to the output of said balanced detector for actuation by the output signal amplitude and in which a filter control actuated from said level sensor has its output connected to said filter whereby the magnitude of the filter time constant is changed inversely by the amplitude of the level sensor input signal.

5. An automatic radio direction finder comprising:
   a first directional antenna;
   a second directional antenna angularly fixed to said first directional antenna;
   a direction indicator;
   motor means for rotating said first and second directional antennas and said direction indicator;
   switch means for periodically reversing the polarity of the output of said first directional antenna;
   means for adding the outputs of said first and second directional antennas whereby their phases are compared;
   means for resolution of the antenna output signals to secure a signal representing the direction of an incoming radio signal with a 180° ambiguity;
   means for applying said signal to actuate said motor means;
   a separate non-directional sensing antenna and receiver channel;
   means for comparing the output phase of said channel with the phase of the directional antennas to resolve the 180° ambiguity;
   an ambiguity-resolving indicator operated by said means for comparing; and
   long-term smoothing means in the output of said means for comparing whereby the sense information output of said sensing antenna is averaged in the presence of noise.

References Cited
UNITED STATES PATENTS

| | | | |
|---|---|---|---|
| 2,314,093 | 3/1943 | Landon | 343—121 |
| 2,605,465 | 7/1952 | Brailsford et al. | 343—120 X |
| 2,840,814 | 6/1958 | Hemphill et al. | 343—121 |

RODNEY D. BENNETT, JR., Primary Examiner

RICHARD E. BERGER, Assistant Examiner

U.S. Cl. X.R.

343—120, 121